United States Patent
Yedidia

(10) Patent No.: US 9,349,106 B2
(45) Date of Patent: May 24, 2016

(54) BOUNDARY GRAPH MACHINE LEARNING ALGORITHM FOR REGRESSION AND CLASSIFICATION

(71) Applicant: Disney Enterprises, Inc., Burbank, CA (US)

(72) Inventor: Jonathan Yedidia, Cambridge, MA (US)

(73) Assignee: Disney Enterprises, Inc., Burbank, CA (US)

( * ) Notice: Subject to any disclaimer, the term of this patent is extended or adjusted under 35 U.S.C. 154(b) by 230 days.

(21) Appl. No.: 14/164,610

(22) Filed: Jan. 27, 2014

(65) Prior Publication Data

US 2015/0149394 A1    May 28, 2015

Related U.S. Application Data

(60) Provisional application No. 61/908,562, filed on Nov. 25, 2013.

(51) Int. Cl.
*G06N 99/00* (2010.01)

(52) U.S. Cl.
CPC .................................. *G06N 99/005* (2013.01)

(58) Field of Classification Search
CPC .................................................... G06N 99/005
See application file for complete search history.

(56) References Cited

U.S. PATENT DOCUMENTS

| | | | | |
|---|---|---|---|---|
| 8,237,716 B2* | 8/2012 | Kolipaka | ............... | G06T 11/206 345/419 |
| 2005/0096887 A1* | 5/2005 | Rice | ........................ | G06F 19/12 703/2 |
| 2014/0143407 A1* | 5/2014 | Zhang | ................... | H04L 41/145 709/224 |
| 2014/0278770 A1* | 9/2014 | Hardy | ................ | G06Q 30/0202 705/7.31 |

* cited by examiner

*Primary Examiner* — Alan Chen
(74) *Attorney, Agent, or Firm* — Farjami & Farjami LLP

(57) ABSTRACT

There is provided a system and method for training and utilizing a boundary graph machine learning algorithm. The system including a processor configured to receive a plurality of entry nodes, each of the plurality of entry nodes including an entry node input and an entry node output, add each of the plurality of entry nodes to a graph using the entry node input and the entry node output, receiving a plurality of training nodes, each of the plurality of training nodes including a training node input and a training node output, add each of the plurality of training nodes to the graph when the training node input for each of the plurality of training nodes is similar to the training node output of a closest node and the training node output of each of the plurality of training nodes is different than the training node output of the closest node.

20 Claims, 5 Drawing Sheets

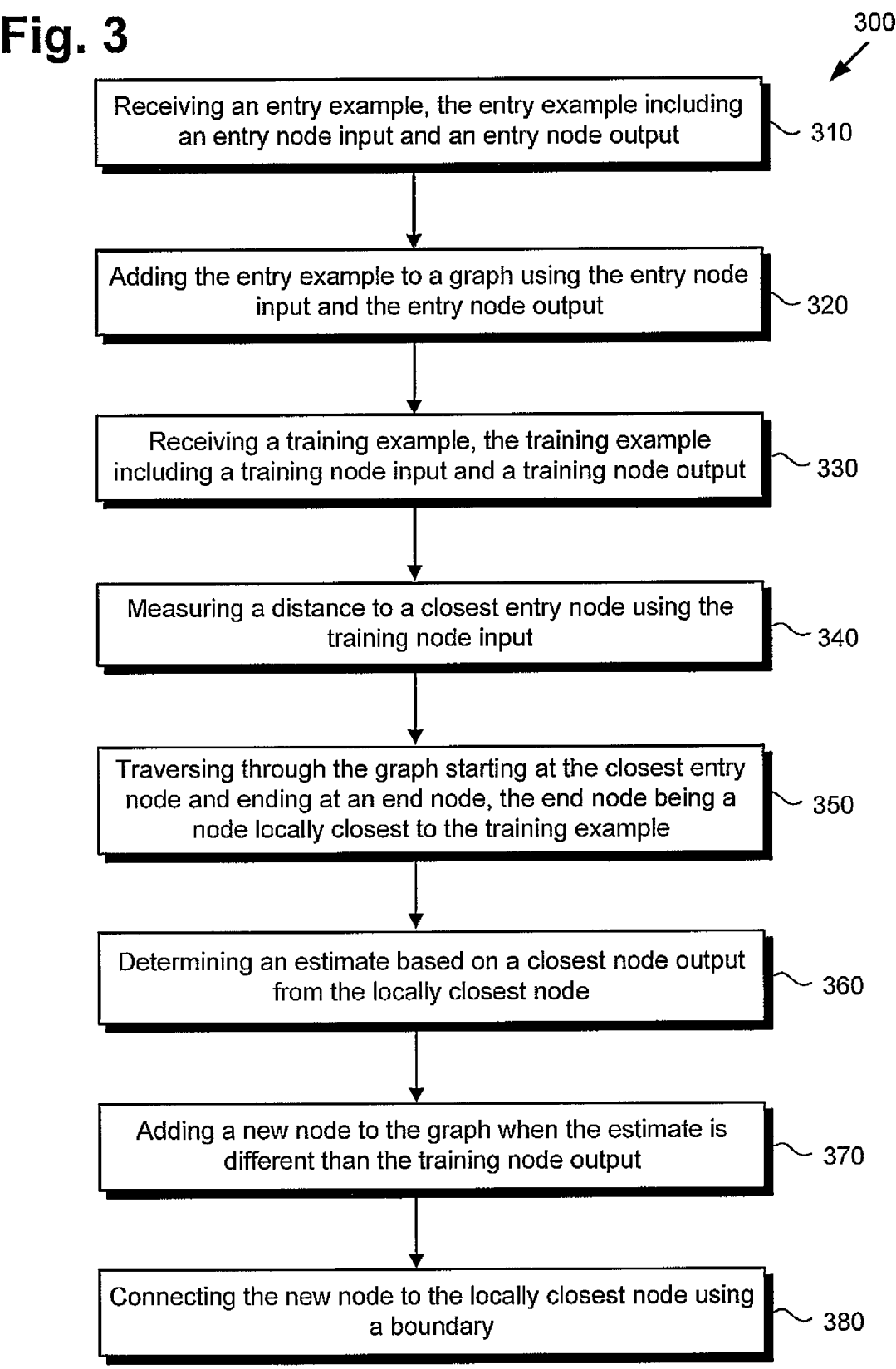

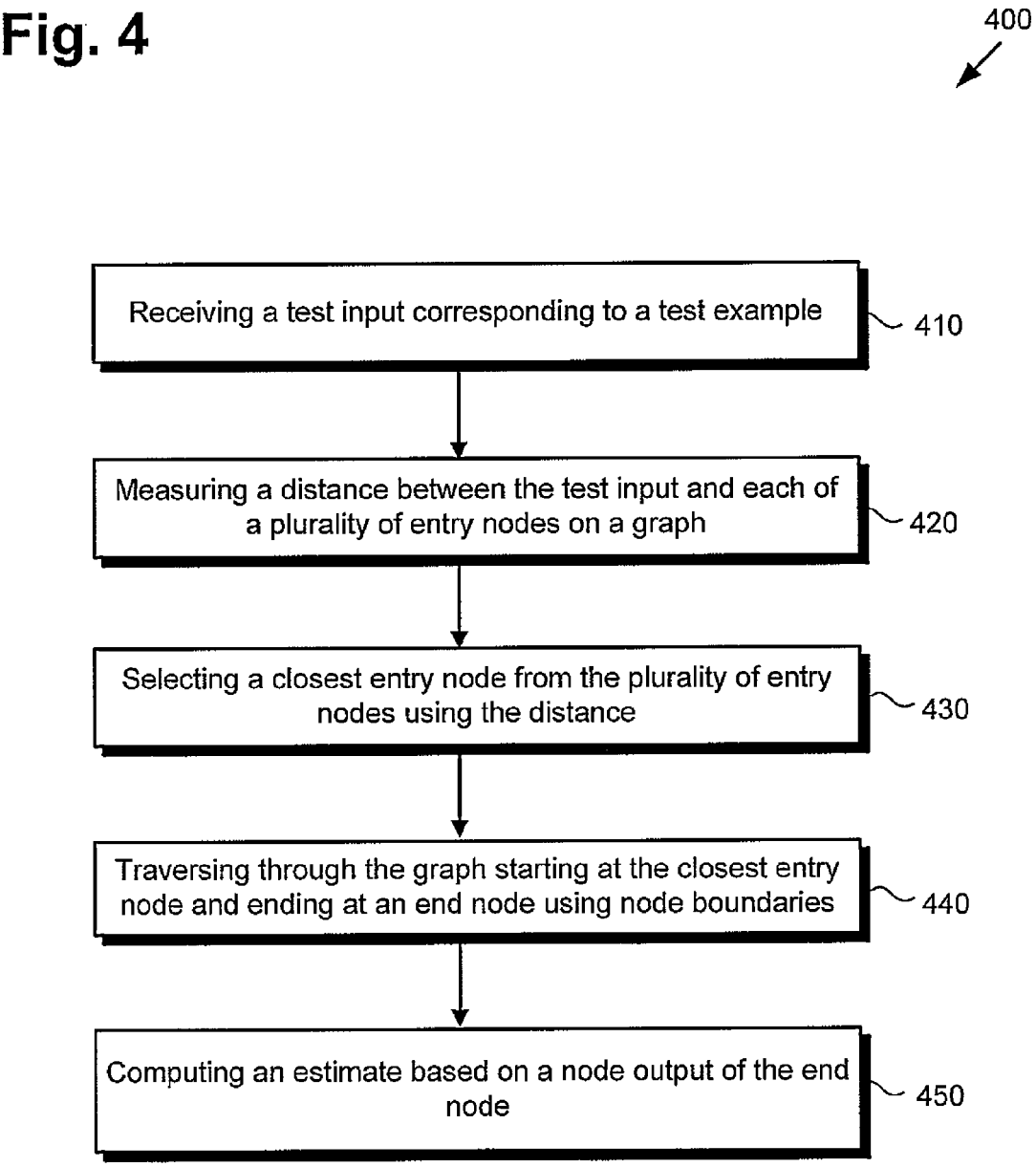

BOUNDARY GRAPH MACHINE LEARNING ALGORITHM FOR REGRESSION AND CLASSIFICATION

RELATED APPLICATION(S)

The present application claims the benefit of and priority to a U.S. Provisional Patent Application Ser. No. 61/908,562, filed Nov. 25, 2013 and titled "Boundary Graph Machine Learning Algorithm for Regression and Classification," which is hereby incorporated by reference in its entirety into the present application.

BACKGROUND

Machine learning algorithms attempt to learn to solve classification problems (e.g. recognizing which handwritten digit has been written from an image) or regression problems (e.g. estimating the price of a financial asset based on various financial variables) by training on a large database of examples where the correct answer is given. They are then typically tested on unknown examples where the correct answer is withheld.

There are a variety of existing machine learning algorithms. The currently leading classes of algorithms for classification include those based on neural networks (particularly popular nowadays are so-called "deep belief networks" (DBNs) trained using the back-propagation algorithm), support vector machines (SVMs) and K-nearest neighbor (KNN) algorithms. Versions of all of these algorithms for regression problems also exist, although they are sometimes less natural.

The performance of a machine learning algorithm can be assessed in several ways. The most popular approach is to assess based on the average error an algorithm makes on a set of test examples, after very many training examples have been presented. Unfortunately, the best machine learning algorithms, as assessed according to this perspective, are extremely slow to train. They typically need very large training corpuses, and the training time can be as long as several CPU-years, which means that clusters of computers and/or GPU acceleration often need to be employed. Existing state-of-the-art machine learning algorithms also "learn" in a way that seems unnatural compared to human learners—for example, if presented with a training example and its correct answer, they may fail to give the correct answer even if the very same example is used as a test query immediately afterward, and only learn the correct answer after thousands of presentations of the example. Also, they tend to perform very poorly if only a small number of training examples are presented, and they often require that training examples be presented in large batches. Finally, some machine learning algorithms become progressively slower to respond to test queries as they learn from larger training sets.

SUMMARY

The present disclosure is directed to a boundary graph machine learning algorithm for regression and classification, substantially as shown in and/or described in connection with at least one of the figures, as set forth more completely in the claims.

BRIEF DESCRIPTION OF THE DRAWINGS

FIG. 3 shows a flowchart illustrating a method for training a boundary graph machine learning algorithm, according to one implementation of the present disclosure.

FIG. 4 shows a flowchart illustrating a method for utilizing a boundary graph machine learning algorithm, according to one implementation of the present disclosure.

DETAILED DESCRIPTION

Figure 1:
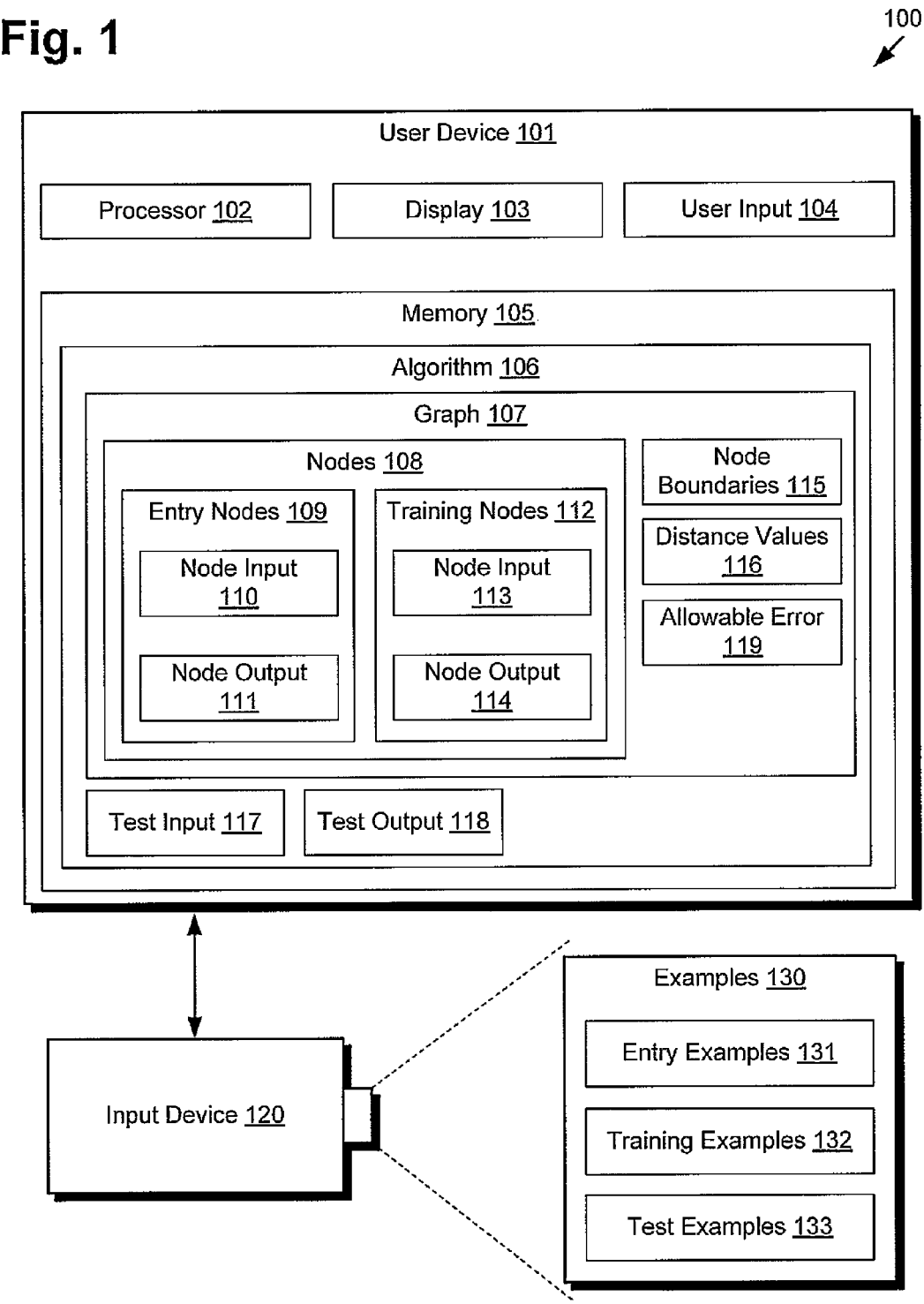
FIG. 1 presents a system for training and utilizing a boundary graph machine learning algorithm, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for creating and utilizing a boundary graph machine learning algorithm, according to one implementation of the present disclosure. System 100 of FIG. 1 includes user device 101, input device 120, and examples 130. User device 101 includes processor 102, display 103, user input 104, and memory 105. Memory 105 includes algorithm 106. Algorithm 106 includes graph 107, test input 117, and test output 118. Graph 107 includes nodes 108, node boundaries 115, distance values 116, and allowable error 119. Nodes 108 includes entry nodes 109 and training nodes 112. Entry nodes 109 includes node input 110 and node output 111. Training nodes 112 includes node input 113 and node output 114. Examples 130 includes entry examples 131, training examples 132, and test examples 133.

User device 101 may comprise a personal computer, a mobile phone, a tablet, a video game console, or any other device capable of executing algorithm 106 in memory 105. As shown in FIG. 1, user device 101 includes display 103 and user input 104. User input 104 may comprise, for example, a keyboard, a mouse, a game controller, a touch-screen input, a thermal and/or electrical sensor, or any other device capable of accepting user input for use with user device 101. Display 103 may comprise a liquid crystal display (LCD) screen built into user device 101. In alternative implementations of the present disclosure, display 103 may be another type of display hardware, such as cathode-ray tubes (CRT) monitors. In yet other implementations, display 103 may also be touch sensitive and may serve as user input 104.

User device 101 further includes processor 102 and memory 105. Processor 102 may be configured to access memory 105 to store received input or to execute commands, processes, or programs stored in memory 105, such as algorithm 106. Processor 102 may correspond to a processing device, such as a microprocessor or similar hardware processing device, or a plurality of hardware devices. However, in other implementations processor 102 refers to a general processor capable of performing the functions required of device 105. Memory 105 is a sufficient memory capable of storing commands, processes, and programs for execution by processor 102. Memory 105 may be instituted as ROM, RAM, flash memory, or any sufficient memory capable of storing a set of commands. In other implementations, memory 105 may correspond to a plurality memory types or modules. Memory 105 may also be protected to prevent outside manipulation of memory 105 or specific portions of memory 105.

As illustrated in FIG. 1, system 100 includes input device 120. Input device 120 may include, but is not limited to, a keyboard, a mouse, a game controller, a touch-screen input, a thermal and/or electrical sensor, a camera, a microphone, or any other device capable of accepting user input for use with algorithm 106 of user device 101. It is noted that in the implementation of FIG. 1, input device 120 is separate from user device 101. In such an implementation, input device 120 may communicate with user device 101 through a physical or wireless connection. In other implementations, input device 120 may not be separate from user device 101 and may be physically attached or built into user device 101. In such implementations, processor 102 of user device 101 controls input device 120 to receive examples 130.

Also illustrated in FIG. 1, system 100 includes examples 130. Examples 130 are utilized by user device 101 to train algorithm 106 by creating graph 107 and to test algorithm 106. For example, examples 130 may include, but are not limited to, pictures, sounds, data input by a user, or any other material for which a user of algorithm 106 may want algorithm 106 to detect or analyze. Examples 130 includes entry examples 131, training examples 132, and test examples 133. Each of entry examples 131, training examples 132, and test examples 133 can include an input and an output so as to be stored on graph 107. The different examples of examples 130 are used by algorithm 106 to either create graph 107 or to test algorithm 106, which is explained in greater detail below when discussing training and utilizing algorithm 106.

It should be noted that when discussing training and utilizing algorithm 106, the present disclosure discusses each of entry examples 131, training examples 132, and test examples 133 as including node inputs and node outputs. As such, entry nodes 109 corresponds to entry examples 131 that have been inputted into algorithm 106 and each includes node input 110 and node output 111. Training nodes 112 corresponds to training examples 132 that have been inputted into algorithm 106 and each includes node input 113 and node output 114, however, not all training examples 132 inputted in algorithm 106 are added to graph 107. Furthermore, test input 117 and test output 118 correspond to the input data and the output data of test examples 133 that have been inputted into algorithm 106. Each of entry examples 131, training examples 132, and test examples 133 is inputted into algorithm 106 using input device 120.

Also illustrated in FIG. 1, algorithm 106 includes graph 107. Graph 107 corresponds to a network of nodes that are connected to each other, such as nodes 108 being connected by node boundaries 115. Nodes 108 correspond to examples 130 that have been inputted into algorithm 106, as will be explained in greater detail below. As such, each node in nodes 108 includes a node input and a node output. Node input 110 and node input 113 include the input received by input device 120 and can be described as an N-Dimensional input vector (x), wherein N can be quite large. Node output 111 and node output 114 include the expected output given node input 110 and node input 113, respectively, and can be described with a D-Dimensional output vector (y). For example, if a node input is an image, a simple representation that performs reasonably well for some problems creates an input vector (x) which has one dimension for each pixel in the image, with the magnitude in that dimension corresponding to the gray value. For another example, if algorithm 106 is being used to identify handwriting, a node input might include an image of a handwritten letter and a node output might include the actual letter as determined by algorithm 106.

The dimensionality D of the output vector (y) of a node output can be equal to one or can be quite large. For example, if algorithm 106 is being used for a scalar regression problem, D would be equal to one since there would only be one determined output for a scalar regression problem. However, if algorithm 106 is being used to learn appropriate control outputs for a robot given input states, the control outputs might be a D-Dimensional vector of controls, wherein D is multi-dimensional.

Also illustrated in FIG. 1, algorithm 106 further includes test input 117 and test output 118. Test input 117 is similar to each of node input 110 and node input 113, and test output 118 is similar to each of node output 111 and node output 114, except for test input 117 and test output 118 correspond to test examples 133. As such, test output 118 may be unknown, while node output 111 and node output 114 are known and input by a user training algorithm 106 to create graph 107 using entry examples 131 and training examples 132.

Also illustrated in FIG. 1 are node boundaries 115 and distance values 116 of nodes 108. As explained above, graph 107 corresponds to a network of nodes 108 that are connected to each other using node boundaries 115. Each node of nodes 108 is connected to at least one other node of nodes 108 using node boundaries 115. Nodes are connected to each other when a node input of a first node and a node input of a second node are similar, but a node output of the first node and a node output of the second node are different. In the literature on graph theory, nodes are usually said to be connected to other nodes by "edges." Here we use the term "node boundary" or "boundary" instead of "edge," because the term "boundary" emphasizes that the connected nodes should have similar inputs and different outputs. Nodes connected by a boundary are called "neighboring" nodes or "neighbors." Distance values 116 are used to determine if the node input of the first node and the node input of the second node are similar, as distance values 116 measure the distance between node inputs of two different nodes 108. For example, if algorithm 106 is used to determine which state a given city is in, each city would include a node with a node input corresponding to its location in the United States and a node output corresponding to the state it is in. Node boundaries 115 would then connect nodes corresponding to cities that are geographically close to each other, but are located in different states. This is because a node input for two cities geographically close to each other would be similar, as a distance value from distance values 116 would be small, however, a node output for the two cities would be different, as each city is located in a different state.

In the implementation of FIG. 1, in order to train algorithm 106, a few parameters are set. First, a user determines how many entry nodes 109 to add to graph 107, where entry nodes 109 correspond to nodes created using entry examples 131. Entry examples 131 are the first of examples 130 to be used and added to graph 107 as entry nodes 109. As such, both node input 110 and node output 111 are input into algorithm 106 for each node created using entry examples 131. Furthermore, entry nodes 109 added using entry examples 131 are automatically added to graph 107. In the implementation of FIG. 1, a user of algorithm 106 can use any positive number of entry examples 131 to add entry nodes 109 to graph 107, wherein between one and one hundred entry examples 131 is preferred.

A second parameter that needs to be set in order to train algorithm 106 is the number of "walks" that will be used for algorithm 106. As will be described in greater detail below, to determine node output 114 or test output 118 when given node input 113 or test input 117, respectively, algorithm 106 first starts at a close entry node from entry nodes 109 and then "walks" from node to node using node boundaries 115 until algorithm 106 reaches an end node, which is the closest node to node input 113 or test input 117 based on distance values 116. As such, a maximum number of "walks" can be set for algorithm 106, which sets how many nodes 108 algorithm 106 will "walk" through until determining node output 114 or test output 118. Furthermore, a different number of "walks" can be set based on if training examples 132 are used or test examples 133 are used.

Finally, a third parameter that needs to be set is allowable error 119 for node output 114 and test output 118. Allowable error 119 sets how close "close enough" is when determining if node output 114 or test output 118 is different than the estimated output. For example, allowable error 119 can be set so that node output 114 or test output 118 has to match the estimate determined by algorithm 106 to be determined correct, or allowable error 119 can set a range for the estimate as compared to node output 114 or test output 118 in order to be considered correct.

In the implementation of FIG. 1, during training of algorithm 106, graph 107 is constructed using examples 130, wherein each of nodes 108 in graph 107 will store a (x, y) pair corresponding to node inputs and node outputs. First, entry nodes 109 from nodes 108 that were created using entry examples 131 are automatically added to graph 107. As explained above, both node input 110 and node output 111 corresponding to each of entry nodes 109 added to graph 107 of algorithm 106 are known.

After entry nodes 109 have been added to graph 107, training examples 132 are inputted into algorithm 106, which may add training nodes 112 to graph 107, based on the following procedure. Entry nodes 109 from nodes 108 that have already been added to graph 107 are ranked by how close each is to each of the inputted training examples 131. To determine how close each entry node is to each of the inputted training examples 131, node input 110 for each of entry nodes 109 is compared to node input 113 of each of training examples 131, which determines distance values 116. Next, using each of the closest entry nodes to an inputted training example, a "walk" through the graph is performed to approach the newly inputted training example. Specifically, starting with at least one of the closest entry nodes, distance values 116 are compared for node input 113 of the new training example with a node input of neighboring nodes 108 already on graph 107. If one of nodes 108 has a closer distance value than the starting entry node selected and has a boundary connecting that node with the starting entry node, then a "walk" is made to that closer node. This procedure of following node boundaries 115 between nodes 108 is repeated until a "locally closest" node to the new training example from nodes 108 is reached. A "locally closest" node is a node that is closer to the training example than any of its neighbors in the graph.

After reaching the locally closest node from nodes 108 to the new training example, an estimate is made for the new training example based on a node output of the locally closest node. The estimate is compared to node output 114 of the new training example, where node output 114 of the new training example is known. If the estimate is within allowable error 119 to node output 114 of the new training example, then a new node is not added to graph 107 based on that training example. However, if the estimate is not within allowable error 119 to node output 114 of the new training example, then a new node is added to graph 107 and it becomes one of training nodes 112. The new node is added to graph 107 using node input 113 and node output 114 of the new node. Furthermore, a boundary is added to node boundaries 115 that connects the new node to the determined locally closest node.

Test examples 133 are similar to training examples 132 in that locally closest nodes in the graph to test examples 133 may be found, however, test output 118 of test examples 133 may be unknown while test input 117 of test examples is known. For example, either in the training phase of algorithm 106, or after a user has finished the training phase of algorithm 106, the user may input test examples 133 into algorithm 106. Algorithm 106 will then proceed with the same "walk" procedure as was done with training examples 132 to determine an estimate for the test example, where test input 117 of the test example is known. The estimate determined by algorithm 106 for the test example should be what is expected for test output 118 of that test example. Normally, test examples are only used to assess the graph created during training. However, if test output 118 of the test example is actually known, and it is different than the estimate determined by algorithm 106, then algorithm 106 can add a new node for that test example to graph 107 in a similar way as adding a training node to training nodes 112 described above.

It should be noted that for inputting training examples 132 and test examples 133 into algorithm 106, only using one of entry nodes 109 is discussed above, however, the present disclosure is not limited to just using one of entry nodes 109. For example, algorithm 106 may perform the same procedure using the two closest entry nodes to an inputted training example or test example and determine an estimate from each of two locally closest nodes. Algorithm 106 may then combine the two estimates in order to estimate an output for the training example or test example. Combining the two estimates may include giving a weight to each of the estimates based on distance values 116 of each of the two locally closest nodes to the training example or test example.

It should further be noted that the above procedure only discusses training and utilizing one algorithm 106 with examples 130, however, the present disclosure is not limited to just training and utilizing one algorithm with examples 130. In other implementations, a user may train and utilize multiple algorithms using the same examples. In such implementations, the user would select a different number of entry nodes to begin with, different training examples that correspond to the entry nodes, or both. Different algorithms may also be trained by presenting the training examples in different orders. The user can then use all the trained algorithms when inputting a test example and combine the estimates from all the trained algorithms to determine a final estimate for that training example.

Figure 2A:
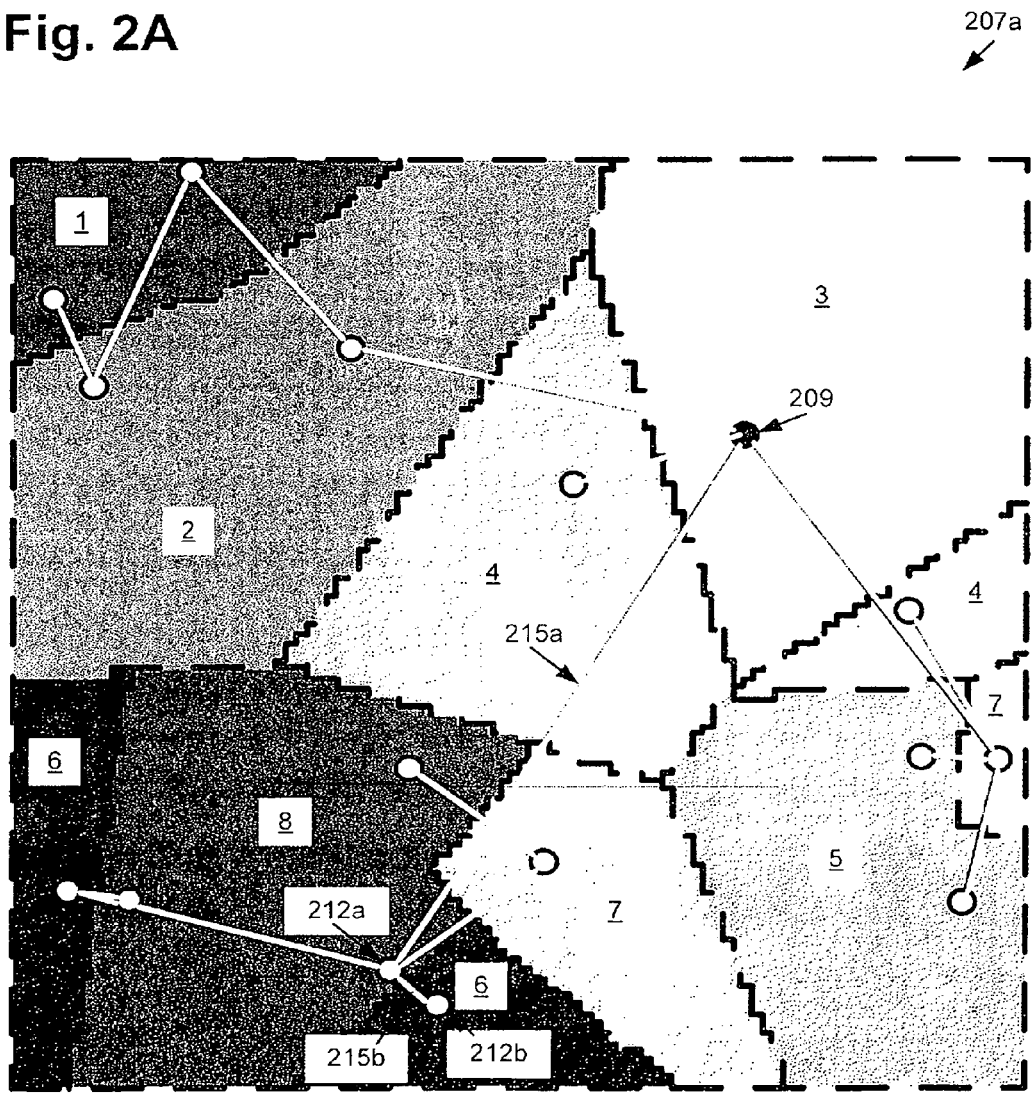
FIG. 2A presents a first example of training a boundary graph for a machine learning algorithm, according to one implementation of the present disclosure.

FIG. 2A presents a first example of training a boundary graph for a machine learning algorithm, according to one implementation of the present disclosure. Graph 207a of FIG. 2A includes entry node 209, training node 212a, training node 212b, node boundary 215a, and node boundary 215b. Graph 207a further includes regions 1-8. With respect to FIG. 2A, it should be noted that graph 207a, entry node 209, training node 212a and training node 212b, and node boundary 215a and node boundary 215b correspond respectively to graph 107, entry node 109, training nodes 112, and node boundaries 115 from FIG. 1. It should further be noted that although only training node 212a, training node 212b, node boundary 215a, and node boundary 215b are labeled for clarity purposes, graph 207a includes multiple training nodes and node boundaries.

Graph 207a is a boundary graph that gives output data corresponding to a region the node is located in given input data corresponding to a location of that node. Graph 207a includes one entry node 209 and multiple training nodes, including training node 212a and training node 212b. Furthermore, graph 207a includes node boundaries connected to the various nodes, including node boundary 215a and node boundary 215b. As illustrated in FIG. 2A, the nodes of graph 207a are connected to each other using a node boundary when the nodes are similarly located on graph 207a based on node inputs, however, the nodes are located in different regions based on node outputs.

Figure 2B:
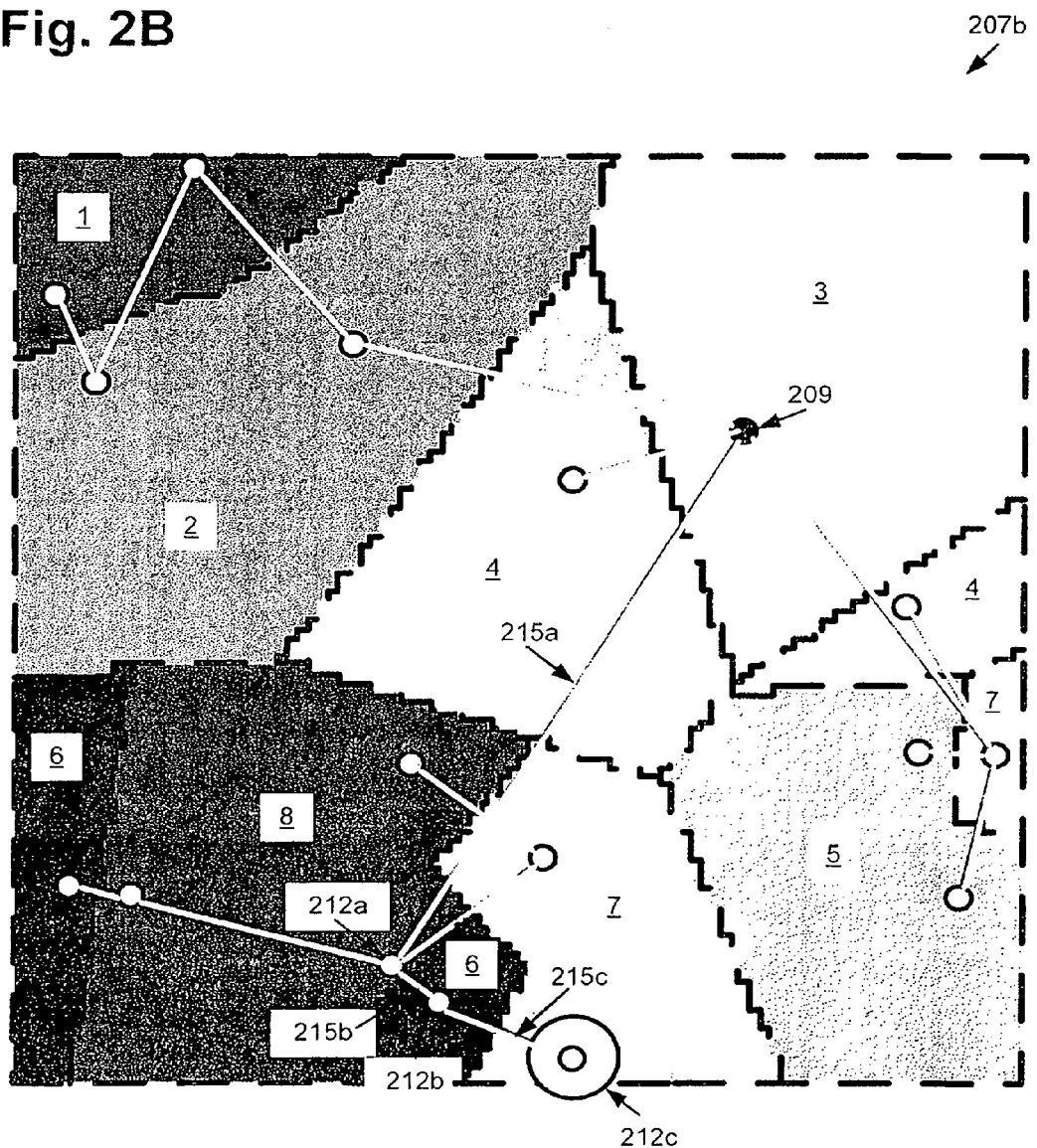
FIG. 2B presents a second example of training a boundary graph for a machine learning algorithm, according to one implementation of the present disclosure.

FIG. 2B presents a second example of training a boundary graph for a machine learning algorithm, according to one implementation of the present disclosure. Graph 207b of FIG. 2B includes entry node 209, training node 212a, training node 212b, training node 212c, node boundary 215a, node boundary 215b, and node boundary 215c. Graph 207b further includes regions 1-8. It should be noted that with respect to FIG. 2B, graph 207b corresponds to graph 207a of FIG. 2A except that training node 212c and node boundary 215c have been added to graph 207b.

As illustrated in the implementation of FIG. 2B, a user of an algorithm that includes graph 207b inputted another training example, such as one of training examples 132 from FIG. 1. As discussed above, to determine if the training example is going to be added to graph 207b, the entry node with the locally closest node input to the node input of the training example is first determined. As shown in FIG. 2B, entry node 209 is the closest entry node to training node 212c, as entry node 209 is the only entry node on graph 207b.

Next, the algorithm "walks" from the entry node to a training node that is closer to the training example, such as walking to training node 212a using node boundary 215a. The algorithm then determines if there is another training node closer to the training example and "walks" to that training node, such as walking to training node 212b using node boundary 215b. Once the algorithm determines that training node 212b is the locally closest node on graph 207b to the training example, the algorithm determines an estimate for the training example based on the node output of training node 212b. In the example of FIG. 2B, the node output of training node 212b corresponds to region 6 as training node 212b is located in region 6.

After determining the estimate for the training example based on the node output of training node 212b, the algorithm checks to see if there is a difference between the estimate and the actual node output for the training example. In the example of FIG. 2B, the actual node output of the training example, corresponding to training node 212c, is region 7. Since the node output of the training example is different than the estimate determined by the algorithm using graph 207b, the algorithm will add a new node to graph 207b corresponding to the training example, such as training node 212c. Furthermore, the algorithm will connect training node 212b and training node 212c using node boundary 215c.

It should be noted that the implementation of FIG. 2B only illustrates a method of training an algorithm using a training example with a known node output, however, the same method can be used for test examples. For example, the algorithm will go through the same steps to determine an estimate for a test example using the node output of the locally closest node. If the actual node output of the test example is known and is different than the estimate determined by the algorithm, then the algorithm may add a new node to the graph corresponding to the test example.

FIG. 3 shows a flowchart illustrating a method for training a boundary graph machine learning algorithm, according to one implementation of the present disclosure. The approach and technique indicated by flowchart 300 are sufficient to describe at least one implementation of the present disclosure, however, other implementations of the disclosure may utilize approaches and techniques different from those shown in flowchart 300. Furthermore, while flowchart 300 is described with respect to FIGS. 1, 2A, and 2B, the disclosed inventive concepts are not intended to be limited by specific features shown and described with respect to FIGS. 1, 2A, and 2B. Furthermore, with respect to the method illustrated in FIG. 3, it is noted that certain details and features have been left out of flowchart 300 in order not to obscure the discussion of inventive features in the present application.

Referring now to flowchart 300 of FIG. 3, flowchart 300 includes receiving an entry example, the entry example including an entry node input and an entry node output (310). For example, processor 102 of user device 101 may receive one of entry examples 131. As discussed above, entry examples 131 that have been inputted into algorithm 106 correspond to entry nodes 109 and each includes node input 109 and node output 110.

Flowchart 300 also includes adding the entry node to a graph using the entry node input and the entry node output (320). For example, processor 102 of user device 101 will add an entry node, such as one of entry nodes 109, to graph 107 of algorithm 106 using node input 109 and node output 110. As discussed above, entry nodes 109 are automatically added to graph 107 using node input 109 and node output 110.

Flowchart 300 also includes receiving a training example, the training example including a training node input and a training node output (330). For example, processor 102 of user device 101 may receive one of training examples 132. As discussed above, training examples 132 that have been inputted into algorithm 106 correspond to training nodes 112 and each includes node input 113 and node output 114.

Flowchart 300 also includes measuring a distance to a closest entry node using the training node input (340). For example, processor 102 of user device 101 may measure a distance from the training example to each of entry nodes 109 on graph 107. Measuring the distance includes measuring a difference between node input 110 for each entry node in entry nodes 109 and node input 113 of the training example. Processor 102 then selects a closest entry node to node input 113.

Flowchart 300 also includes traversing through the graph starting at a closest entry node and ending at an end node, the end node being a node locally closest to the training example (350). For example, processor 102 of user device 101 will start at the closest entry node to the training example from entry nodes 109 and "walk" along node boundaries 115 until reaching the locally closest node to the training example from nodes 108. The locally closest training node is determined based on node inputs.

Flowchart 300 also includes determining an estimate based on a closest node output from the locally closest node (360). For example, processor 102 of user device 101 will determine an estimate based on either node output 111 or node output 114 of the locally closest node from nodes 108 to the training example, depending on whether the locally closest node is one of entry nodes 109 or training nodes 112.

Flowchart 300 also includes adding a new node to the graph when the estimate is different that the training node output (370). For example, if processor 102 of user device 101 determines that the estimate determined is different than node output 114 of the training example, then processor 102 will add a new node to graph 107 using node input 113 and node output 114 of the training example. The new node will be added to training nodes 112. Finally, flowchart 300 includes connecting the new node to the locally closest node using a boundary (380). For example, processor 102 of user device 101 will connect the new node to the locally closest node using a boundary, such as one of node boundaries 115.

It is noted that the above method only discusses using one entry example and one training example to train algorithm 106, however, the method is not limited to using only one entry example and one training example. For example, as discussed above, multiple entry examples 131 may be inputted into algorithm 106 in order to add multiple entry nodes to graph 107. Furthermore, multiple training examples 132 may be inputted into algorithm 106 in order to add multiple training nodes 112 to graph 107. As discussed above, not all training examples inputted into algorithm 106 will be added to graph 107. Only training examples 132 that have a similar node input to a locally closest node and a different node output than the closest node will be added to graph 107.

FIG. 4 shows a flowchart illustrating a method for utilizing a boundary graph machine learning algorithm, according to one implementation of the present disclosure. The approach and technique indicated by flowchart 400 are sufficient to describe at least one implementation of the present disclosure, however, other implementations of the disclosure may utilize approaches and techniques different from those shown in flowchart 400. Furthermore, while flowchart 400 is described with respect to FIGS. 1, 2A, and 2B, the disclosed inventive concepts are not intended to be limited by specific features shown and described with respect to FIGS. 1, 2A, and 2B. Furthermore, with respect to the method illustrated in FIG. 4, it is noted that certain details and features have been left out of flowchart 400 in order not to obscure the discussion of inventive features in the present application.

Referring now to flowchart 400 of FIG. 4, flowchart 400 includes receiving a test input corresponding to a test example (410). For example, processor 102 of user device 101 may receive test input 117 corresponding to one of test examples 133. Processor 102 may receive test input 117 anytime during the training phase of algorithm 106 as algorithm 106 is an online algorithm. Furthermore, processor 102 may receive test input 117 after the training phase of algorithm 106.

Flowchart 400 also includes measuring a distance between the test input and each of a plurality of entry nodes on a graph of an algorithm (420). For example, processor 102 of user device 101 may measure a distance between test input 117 and each of entry nodes 109 on graph 107 of algorithm 106, such as distance values 116. Distance values 116 are measured by comparing test input 117 to node input 110 of each of entry nodes 109.

Flowchart 400 also includes selecting a closest entry node from the plurality of entry nodes using the distance (430). For example, processor 102 of user device 101 may select the closest node from entry nodes 109 based on distance values 116. Next, flowchart 400 includes traversing through the graph starting at the closest entry node and ending at an end node using node boundaries (440). For example, processor 102 of user device 101 may traverse through graph 107 starting at the closest entry node from entry nodes 109 and ending at an end node from nodes 108 using node boundaries 115. As discussed above, the closest node is the node that is locally closest to test input 117 based on either node input 110 or node input 113, depending on if one of entry nodes 109 or training nodes 112 is closer.

Flowchart 400 also includes computing an estimate based on a node output of the end node (450). For example, processor 102 of user device 101 may determine an estimate based on either node output 111 or node output 114, based on whether one of entry nodes 109 or one of training nodes 112 is closer to test input 117.

It should be noted that the method of flowchart 400 only discusses using the closest entry node to test input 117 to determine an estimate for test input 117, however, the method of flowchart 400 is not limiting. For example, the method of flowchart 400 may be performed a second time using the second closest entry node. In such an example, processor 102 traverses through graph 107 starting at the second closest entry node to test input 117 and ends at a second closest node. Processor 102 then uses the node output of the second closest node to determine a second estimate for test input 117. Finally, processor 102 combines the estimate determined using the closest entry node and the second estimate determined using the second closest entry node to determine a final estimate.

It is further noted that in some implementations, processor 102 may add test input 117 to graph 118 when test output 118 is known. For example, after processor 102 determines an estimate using node output 114 of the closest node to test input 117, processor 102 can compare the estimate to node output 118. In such an example, if the estimate is different than node output 118, processor 102 can add a new node to graph 107 using test input 117 and test output 118. Processor 102 may then connect the new node to the closest node using a boundary.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system, the system comprising:
   a processor configured to execute a machine learning algorithm; and
   a memory configured to store the machine learning algorithm, the machine learning algorithm including a graph with nodes, wherein
      each of the nodes is associated with an input data and an output data, and
      pairs of the nodes are connected by a boundary when the input data associated with a first node from the nodes is similar to the input data associated with a second node from the nodes and the output data associated with the first node from the nodes is different than the output data associated with the second node from the nodes.

2. The system of claim 1, wherein the processor is further configured to:
   receive a test input data;
   measure a distance between the test input data and the input data associated with each of a plurality of entry nodes from the nodes;
   select a first entry node from the plurality of entry nodes, the first entry node corresponding to one of the plurality of entry nodes with a first smallest distance value;
   traverse through the graph starting with the first entry node and ending at a first end node from the nodes; and
   compute a first estimate based on the output data associated with the first end node.

3. The system of claim 2, wherein the processor is further configured to:
- select a second entry node from the plurality of entry nodes, the second entry node corresponding to a second of the plurality of entry nodes with a second smallest distance value;
- traverse through the graph starting with the second entry node and ending at a second end node from the nodes;
- compute a second estimate based on the output data associated with the second end node; and
- update the first estimate based on the second estimate.

4. The system of claim 2, wherein the processor is further configured to:
- receive a test output data; and
- add a new node to the nodes when the test output data does not match the first estimate, wherein the input data of the new node corresponds to the test input data and the output data of the new node corresponds to the test output data.

5. The system of claim 2, wherein the machine learning algorithm further includes a second graph with second nodes, wherein each of the second nodes is associated with a second input data and a second output data, and wherein the processor is further configured to:
- measure a second distance between the test input data and the second input data associated with each of a plurality of second entry nodes from the second nodes;
- select a second entry node from the plurality of second entry nodes, the second entry node corresponding to one of the plurality of second entry nodes closest to the test input data;
- traverse through the second graph starting with the second entry node and ending at a second end node from the second nodes;
- compute a second estimate based on the second output data associated with the second end node; and
- update the first estimate with the second estimate.

6. The system of claim 1, wherein the graph corresponds to a network.

7. A system, the system comprising:
- a memory for storing a machine learning algorithm, the machine learning algorithm including a graph; and
- a processor configured to:
  - receive a first entry node, the first entry node including a first input data and a first output data;
  - add the first entry node to the graph using the first input data and the first output data;
  - receive a first training node, the first training node including a second input data and a second output data:
  - add the first training node to the graph when the second input data is similar to the first input data and the second output data is different than the first output data; and
  - connect the first entry node to the first training node using a first boundary.

8. The system of claim 7, wherein the processor is further configured to:
- receive a second training node, the second training node including a third input data and a third output data, wherein a first distance between the second training node and the first training node is smaller than a second distance between the second training node and the first entry node;
- traverse through the graph starting from the first entry node and ending at the first training node;
- add the second training node to the graph when the third output data is different than the second output data; and
- connect the first training node to the second training node using a second boundary.

9. The system of claim 7, wherein the processor is further configured to:
- receive a test input data;
- traverse through the graph starting with the first entry node and ending at the first training node, the first training node having a distance closer to the test input data than the first entry node; and
- compute a first estimate based on the second output data of the first training node.

10. The system of claim 9, wherein the processor is further configured to:
- receive a test output data; and
- add a new node to the graph when the test output data is different than the first estimate.

11. The system of claim 7, wherein before receiving the first training node the processor is further configured to:
- receive a plurality of entry nodes, each of the plurality of entry nodes including entry input data and entry output data; and
- add each of the plurality of entry nodes to the graph using the entry input data and the entry output data of each of the plurality of entry nodes.

12. The system of claim 11, wherein the processor is further configured to:
- receive a plurality of training nodes, each of the plurality of training nodes including training input data and training output data; and
- add each of the plurality of training nodes to the graph when the training input data of each of the plurality of training nodes is similar to a closest input data for a locally closest node and the training output data of each of the plurality of training nodes is different than a closest output data for the locally closest node.

13. The system of claim 12, wherein each of the plurality of training nodes added to the graph is connected to the locally closest one of the plurality of training nodes using a connection boundary.

14. The system of claim 7, wherein the graph corresponds to a network.

15. A method, the method comprising:
- receiving a first entry node, the first entry node including a first input data and a first output data:
- adding the first entry node to a graph using the first input data and the first output data:
- receiving a first training node, the first training node including a second input data and a second output data:
- adding the first training node to the graph when the second input data is similar to the first input data and the second output data is different than the first output data; and
- connecting the first entry node to the first training node using a first boundary.

16. The method of claim 15, further comprising:
- receiving a second training node, the second training node including a third input data and a third output data, wherein a first distance between the second training node and the first training node is smaller than a second distance between the second training node and the first entry node;
- traversing through the graph starting from the first entry node and ending at the first training node;
- adding the second training node to the graph when the third output data is different than the second output data; and connecting the first training node to the second training node using a second boundary.

17. The method of claim 15, further comprising:
receiving a test input data;
traversing through the graph starting with the first entry node and ending at the first training node, the first training node having a distance closer to the test input data than the first entry node;
computing a first estimate based on the second output data of the first training node;
receiving a test output data; and
adding a new node to the graph when the test output data is different than the first estimate.

18. The method of claim 15, wherein before receiving the first training node the method further comprises:
receiving a plurality of entry nodes, each of the plurality of entry nodes including entry input data and entry output data; and
adding each of the plurality of entry nodes to the graph using the entry input data and the entry output data of each of the plurality of entry nodes.

19. The method of claim 18, the method further comprising:
receiving a plurality of training nodes, each of the plurality of training nodes including training input data and training output data; and
adding each of the plurality of training nodes to the graph when the training input data of each of the plurality of training nodes is similar to a closest input data for a locally closest node and the training output data of each of the plurality of training nodes is different than a closest output data for the locally closest node.

20. The method of claim 15, wherein the graph corresponds to a network.

* * * * *